June 29, 1926.

E. L. SCHUMACHER ET AL

OPHTHALMIC MOUNTING

Filed Nov. 14, 1924

1,590,324

INVENTOR
Elmer L. Schumacher.
William H. Boutelle.
BY
Harry H. Styll
ATTORNEY

Patented June 29, 1926.

1,590,324

UNITED STATES PATENT OFFICE.

ELMER L. SCHUMACHER, OF SOUTHBRIDGE, AND WILLIAM H. BOUTELLE, OF STURBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed November 14, 1924. Serial No. 749,922.

This invention relates to improvements in ophthalmic mountings and has particular reference to the provision of an improved temple and to an improved method of producing the same. Prior to this invention there have been a great many attempts to produce a nonmetallic spectacle temple from celluloid or other similar composition material which will be light in weight together with suitable mechanical strength and neatness in appearance.

One of the principal difficulties which has been met in the production of such devices has resided in the fact that the cellulose material used had a peculiar property of tending to return to its initial shape so that when a piece of it such as used in a temple is bent as required to form an ear engaging portion it could not always be relied upon to maintain a given shape without some sort of metallic reinforcement. One method of overcoming this objectionable feature has been in producing a composition material from tubing and inserting a metallic core inside the tubing but this has been rather expensive to manufacture. With the present invention, the temple bar may be formed of ordinary sheet or rod stock as is desired, and a metallic reinforcement is inserted in one of its surfaces in a manner which will be economical to produce and neat in appearance.

An important object of the invention is to provide a nonmetallic temple formed of rod stock which will have a metal reinforcement coextensive with the bent portion thereof. Another object is to provide such a device wherein a metallic reinforcing strip is embedded in one surface of a nonmetallic temple bar in such a way as to be substantially invisible when the device is in use.

Another object is to provide such a device wherein a metallic reinforcement is completely embedded and interlocked in the nonmetallic temple bar so as to be incapable of loosening.

Another object is to provide an improved method of producing such a device whereby manufacturing will be simplified and the cost accordingly lessened.

With these and other objects in view the invention resides in the novel features of construction, combination and arrangement of parts hereinafter specifically pointed out, illustrated in the accompanying drawings and specifically set forth in the appended claims.

In the drawings forming a part of this application and wherein similar reference characters are used to designate corresponding parts through the several views.

Figure 1:
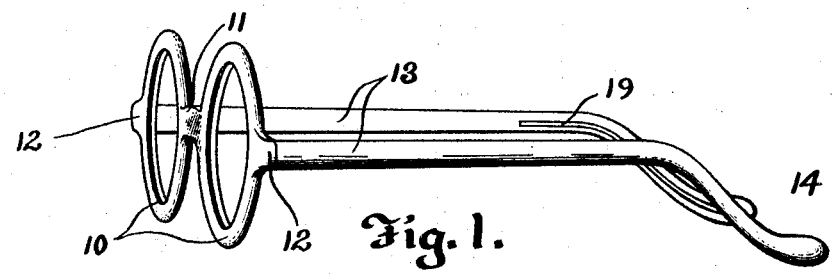
Figure 1 is a perspective view of a spectacle provided with temples embodying the invention.

In Figure 1 is illustrated an ophthalmic mounting comprising a pair of lens rims 10 being connected by a bridge member 11 and fitted at their opposite sides with endpieces 12 to which a pair of temples 13 are hingedly connected in any preferred manner. This mounting is of the general type so much in vogue at the present time, made of nonmetallic composition material and preferably formed to simulate tortoiseshell in appearance. The temples 13 are offset as at 14 at their rear end to form an ear or skull engaging portion whereby the device will be securely held in place.

Figure 2:
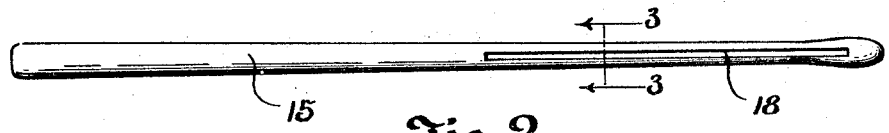
Figure 2 is a side elevation of a temple bar blank.
Figure 3:
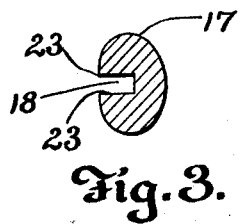
Figure 3 is a transverse sectional view on the line 3—3 of Figure 2.
Figure 4:
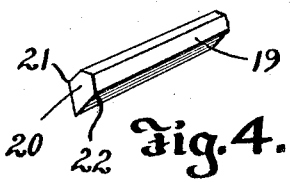
Figure 4 is a detail perspective view of one form of metallic insert.
Figure 5:
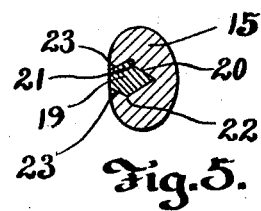
Figure 5 is a transverse sectional view through the temple illustrating the metallic insert in place.
Figure 6:
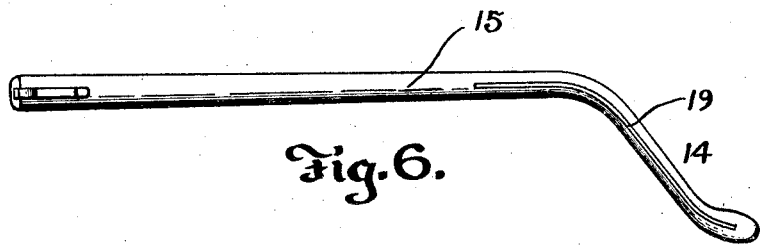
Figure 6 is a side elevation of the finished temple after it has been bent to the proper shape.

As best shown in Figures 2 and 3 the temple 13 is formed from a blank 15 which may be cut from rod stock or from sheet material as is desired and is preferably provided with rounded edges as at 17 and tapering from the forward to the rearward end. In one of the surfaces, preferably the inner side of the finished temple, a groove or slot 18 is cut, as by milling, or any other suitable operation, into which a metallic reinforcement is inserted.

The reference character 19 designates a metallic reinforcement which may be used in a temple of this type and comprises an elongated wire having a cross sectional transfiguration of an irregular pentagon as shown at 20. The widest portion of the wire, as the distance between the points 21 and 22, is slightly greater than the width of the slot 18. After the two portions have thus been suitably formed, the blank 15 is softened as by heating, and the wire 19 forced into the slot 18, after which, if desired, the two pieces may be rolled together so as to properly interlock the composition material about the wire 19. In this way, the corners 23 of the nonmetallic material are forced down upon and in engagement with the inclined wall of the wire 19 with the outer surface of said wire flush with the surface of the temple bar 15.

After the metal and nonmetallic members 15 and 19 are thus assembled they may be bent into the form 14 to provide the proper ear engaging portion and in view of the fact that the metallic reinforcement is coextensive with said bent portion the whole device may be relied upon to maintain the shape to which it is bent.

From the foregoing it will be evident that an improved ophthalmic temple has been produced wherein a nonmetallic temple bar is provided with a suitable reinforcement coextensive with its bent ear engaging portion, said reinforcement being substantially invisible when the device is in use. The method of producing the same is simple and therefore economical to produce. Obviously, changes may be resorted to in the minor details of construction of the parts and in the arrangement of the steps in the process, and the right is herein reserved to make such changes falling within the scope of the appended claims without departing from the spirit of the invention.

Having thus described the invention, what is claimed is:

1. In a device of the character described, a shaped temple of composition material having complete side and ear portions which has the inherent property of returning to its original position if displaced, and having a longitudinal slot of substantially the extent of the ear portion thereof on the head side of the temple, and a strip of ductile material in the slot having the property of remaining in displaced position and of sufficient body to hold the composition material in displaced position when the ductile material is bent.

2. In a device of the character described, a shaped temple of composition material having complete side and ear portions which has the inherent property of returning to its original position if displaced and having a longitudinal slot of substantially the extent of the ear portion thereof on the head side of the temple, a strip of ductile material in the slot having the property of remaining in displaced position and of sufficient body to hold the composition material in displaced position when the ductile material is bent, said ductile material having a portion wider than the entrance of the slot adapted to retain the ductile material in the slot.

ELMER L. SCHUMACHER.
WILLIAM H. BOUTELLE.